US011097677B1

(12) United States Patent
DiAntonio et al.

(10) Patent No.: US 11,097,677 B1
(45) Date of Patent: Aug. 24, 2021

(54) WOODEN BUMPER ASSEMBLY

(71) Applicant: McCue Corporation, Peabody, MA (US)

(72) Inventors: David DiAntonio, Andover, MA (US); Evan Oswald, Marblehead, MA (US); Teodoro A. Mesa, Lynn, MA (US)

(73) Assignee: McCue Corporation, Danvers, MA (US)

( * ) Notice: Subject to any disclaimer, the term of this patent is extended or adjusted under 35 U.S.C. 154(b) by 16 days.

(21) Appl. No.: 16/788,703

(22) Filed: Feb. 12, 2020

(51) Int. Cl.
*B60R 19/03* (2006.01)
*B60R 19/02* (2006.01)
*B60R 19/24* (2006.01)

(52) U.S. Cl.
CPC ............ *B60R 19/03* (2013.01); *B60R 19/023* (2013.01); *B60R 19/24* (2013.01)

(58) Field of Classification Search
CPC ........ B60R 19/03; B60R 19/24; B60R 19/023
USPC .................................................. 293/120, 102
See application file for complete search history.

(56) References Cited

U.S. PATENT DOCUMENTS

| 2,806,688 | A | * | 9/1957 | Pollock | ................... | B60R 19/02 267/140 |
| 4,066,285 | A | | 1/1978 | Hall et al. | | |
| 4,286,630 | A | | 9/1981 | Happer | | |
| 4,671,550 | A | * | 6/1987 | Molnar | ................... | B60R 19/18 293/102 |
| 5,096,753 | A | | 3/1992 | McCue et al. | | |
| 5,134,250 | A | | 7/1992 | Caveney et al. | | |
| 6,205,741 | B1 | | 3/2001 | Couto et al. | | |
| 8,132,851 | B2 | * | 3/2012 | Steller | ..................... | B60R 19/12 296/187.04 |
| 8,936,285 | B2 | * | 1/2015 | Inoue | ..................... | B60R 19/18 293/132 |
| 10,953,826 | B1 | * | 3/2021 | Miura | ..................... | B60R 19/03 |
| 2011/0309044 | A1 | | 12/2011 | Morrow | | |
| 2016/0174709 | A1 | | 6/2016 | Ustach et al. | | |

FOREIGN PATENT DOCUMENTS

GB 2482678 A 2/2012

* cited by examiner

*Primary Examiner* — Pinel E Romain
(74) *Attorney, Agent, or Firm* — Occhiuti & Rohlicek LLP (57) ABSTRACT

A bumper assembly includes an elongate shell formed of a wooden material and an elongate base. The elongate shell has an inner surface, an outer surface, a first shell edge, and a first flange protruding from the first shell edge in a direction toward the inner surface of the elongate shell. The elongate base includes a base body including a first base edge and a first latching element extending from the first base edge of the base body, the first latching element having a first inclined outer surface and a first shoulder. The elongate base is configured for insertion into the elongate shell with the first flange engaging the first shoulder of the first latching element.

15 Claims, 6 Drawing Sheets

WOODEN BUMPER ASSEMBLY

BACKGROUND

This invention relates to a bamboo bumper assembly.

In commercial environments such as retail stores, goods are often stored and displayed in product storage fixtures such as display cases, shelving, and refrigeration units. Generally, product storage fixtures in a store are arranged to form aisles through which customers, along with their shopping baskets and carts, pass as they shop. As the customers, their shopping baskets, and carts pass through the aisles, they often bump into or rub against the product storage fixtures, potentially causing damage to the product storage fixtures.

To mitigate damage to product storage fixtures, bumpers are often installed on or near the exterior surfaces of product storage fixtures. Such bumpers prevent damage to the product storage fixtures by deflecting and/or absorbing the force of impact by objects such as shopping carts, shopping baskets, and customers.

Bumpers are often fabricated using non-renewable, non-biodegradable, petroleum-based plastic materials.

SUMMARY

Due to environmental concerns, bumpers made of non-renewable, non-biodegradable, and/or petroleum based (e.g., plastic) materials are falling out of favor with consumers and retailers. Aspects described herein relate to a wooden (e.g., bamboo) bumper assembly that is intended to replace conventional bumper assembly. The wooden bumper assembly is fabricated, at least in part, from a wooden material such as bamboo, which is a biodegradable, fast growing, and renewable natural resource.

In a general aspect, a bumper assembly includes an elongate shell formed of a wooden material and an elongate base. The elongate shell has an inner surface, an outer surface, a first shell edge, and a first flange protruding from the first shell edge in a direction toward the inner surface of the elongate shell. The elongate base includes a base body including a first base edge and a first latching element extending from the first base edge of the base body, the first latching element having a first inclined outer surface and a first shoulder. The elongate base is configured for insertion into the elongate shell with the first flange engaging the first shoulder of the first latching element.

Aspects may include one or more of the following features.

The wooden material may be a bamboo material. The elongate base may be formed of the wooden material. The elongate base may be formed of a metallic material. The metallic material may be an aluminum material. The first latching element may be flexible. The first latching element may be rigid. The outer surface of the elongate shell may have a substantially semi-cylindrical shape.

A cross section of the outer surface of the elongate shell may have a substantially trapezoidal shape. A cross section of the outer surface of the elongate shell may have a substantially rectangular shape. The elongate shell may include an second shell edge, and an second flange protruding from the second shell edge in a direction toward the inner surface of the elongate shell, and the elongate base may include a second base edge, and a second latching element extending from the second base edge of the base body, the second latching element having a second inclined outer surface and a second shoulder. The elongate base may be configured for insertion into the elongate shell with the second flange engaging the second shoulder of the second latching element.

The second latching element may be smaller than the first latching element and the second inclined outer surface has a relatively steeper incline than the first inclined outer surface. The second latching element may be flexible. The second latching element may be rigid.

Aspects may include one or more of the following advantages.

Aspects have a simpler installation procedure as compared to some conventional bumpers due to the two-piece bumper assembly.

Aspects are more aesthetically pleasing than some conventional bumpers due to the two-piece bumper assembly and their natural wood appearance.

Aspects are advantageously made, at least in part, from environmentally friendly, biodegradable, renewable, and/or non-petroleum based materials.

Other features and advantages of the invention are apparent from the following description, and from the claims.

DESCRIPTION

1 Wooden Bumper Assembly with Wooden Base

Figure 1:
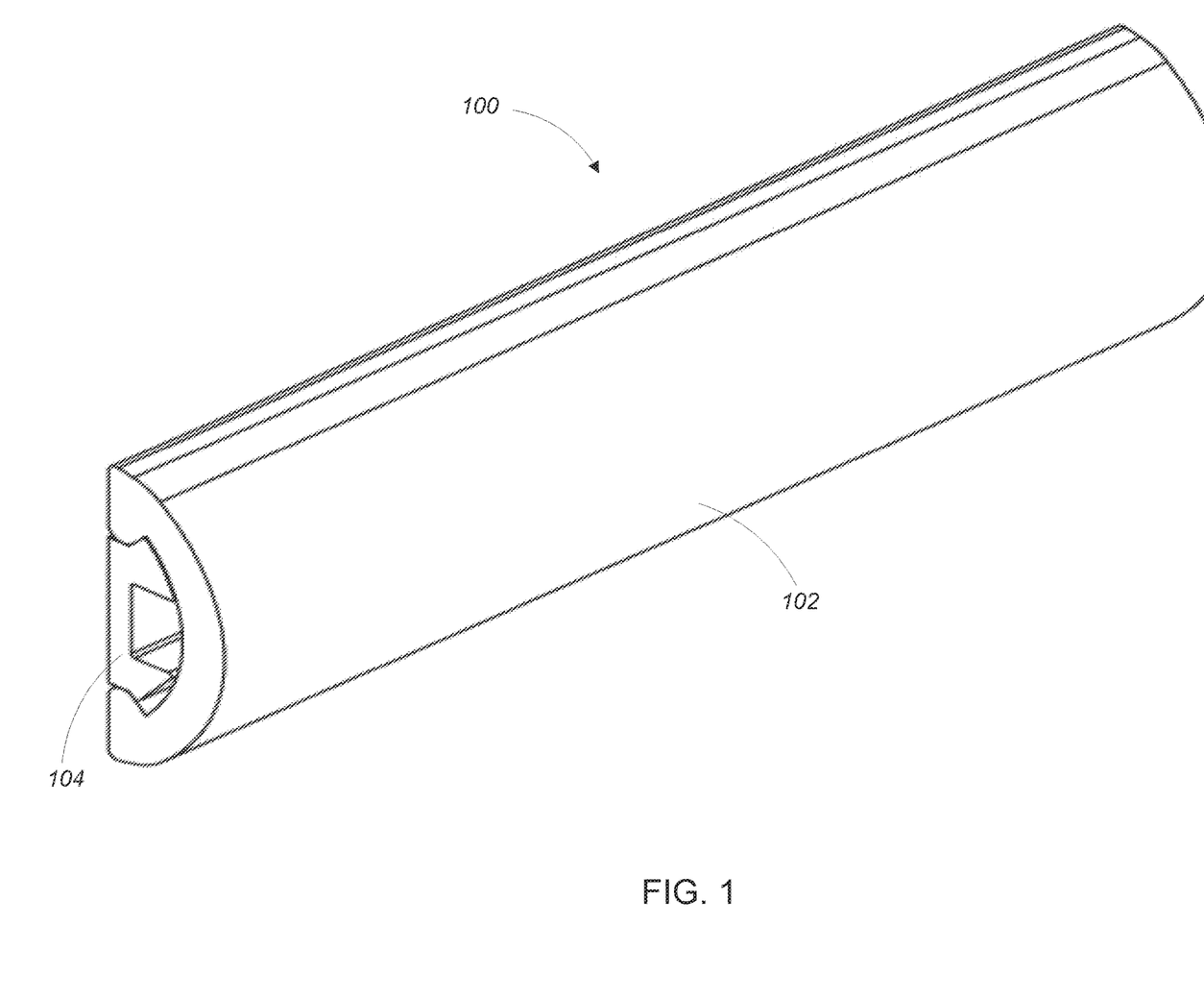
FIG. 1 is a perspective view of a wooden bumper assembly with a wooden base.

Referring to FIG. 1, a wooden bumper assembly 100 includes an elongate shell 102 and an elongate base 104. In the example of FIG. 1, both the elongate shell 102 and the elongate base 104 are fabricated from wooden material (e.g., laminated bamboo strips). In FIG. 1, the wooden bumper assembly 100 is shown in its assembled state, with the elongate base 104 inserted into the elongate shell 102. Very generally, the wooden bumper assembly 100 has a simplified installation process (as is described in greater detail below) due to the elongate base 104 and the elongate shell 102 being formed as two separate parts.

Figure 2:
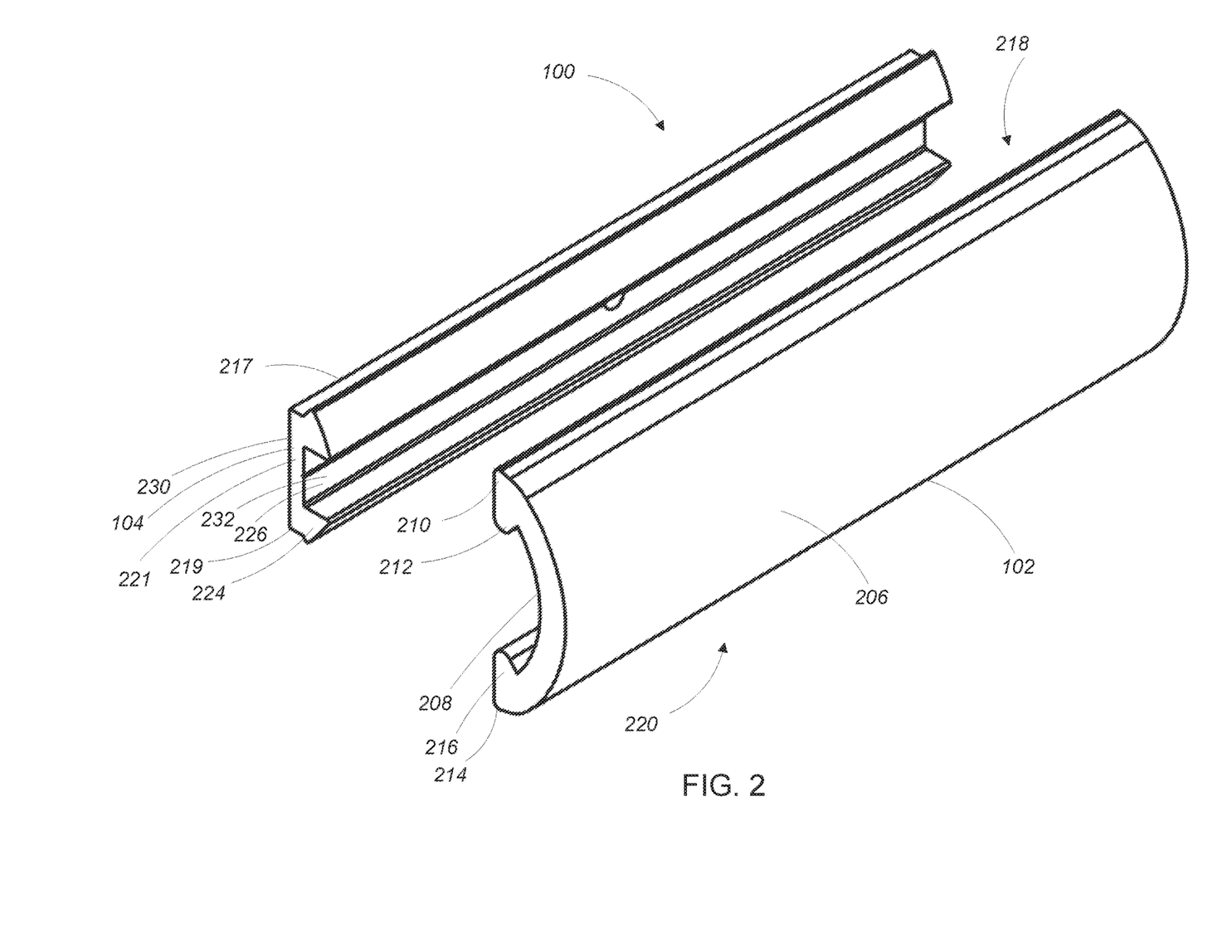
FIG. 2 is an exploded view of the wooden bumper assembly of FIG. 1.

Referring to FIG. 2, an exploded view of the wooden bumper assembly 100 shows the elongate shell 102 and the elongate base 104 in a disassembled state. The elongate shell 102 is a substantially hollow, semi-cylindrical member including an outer surface 206, an inner surface 208, a first edge 210, a first flange 212, a second edge 214, and a second flange 216. The outer surface 206 of the elongate shell 102 faces away from the elongate base 104 and serves as the surface of the elongate shell 102 that receives the force of impact of objects that hit the wooden bumper assembly 100. The inner surface 208 of the elongate shell 102 faces the elongate base 104.

The first edge 210 runs along a length of a first side 218 of the elongate shell 102. The first flange 212 runs along the length of the elongate shell 102 and extends from the first edge 210 toward the hollow interior space delimited by the inner surface 208 of the elongate shell 102. The second edge 214 runs along a length of a second side 220 (opposite the first side 218) of the elongate shell 102. The second flange 216 runs along the length of the elongate shell 102 and extends from the second edge 214 toward the hollow interior space delimited by the inner surface 208 of the elongate shell 102.

As described in greater detail below, the elongate base 104 includes a base body 221 having a first side 230 which lies flush with a mounting surface when the elongate base 104 is installed. The base body 221 has a second side 232 facing away from the first side 230 and including a number of elements including an attachment portion 226, a first latching element 222 extending from a first base edge 217, and a second latching element 224 extending from a second base edge 219, each of which extends along a length of the elongate base 104.

1.1 Elongate Base

Figure 3:
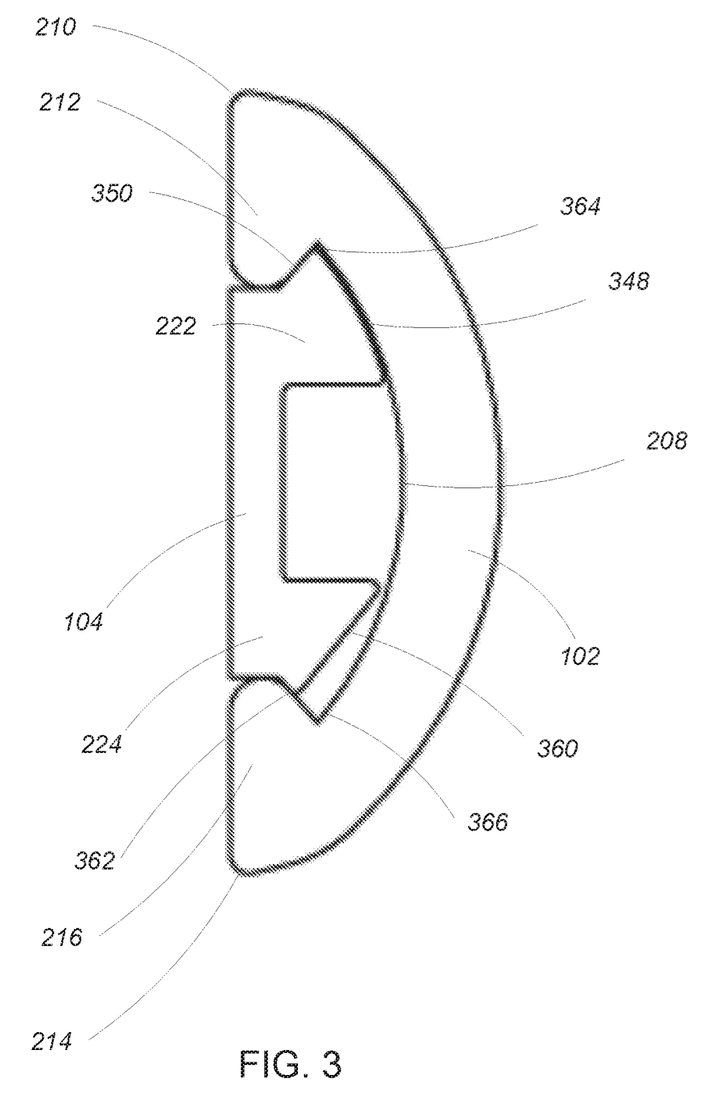
FIG. 3 is a cross-sectional view of the wooden bumper assembly of FIG. 1.

Referring to FIG. 3, in a cross-sectional view of the wooden bumper assembly 100, the first latching element 222 includes a first inclined surface 348 and a first shoulder 350. The second latching element 224 includes a second inclined surface 360 and a second shoulder 362. In the example shown in FIG. 3, the second latching element 224 is shorter than the first latching element 222 and the second inclined surface 360 has a steeper incline than the first inclined surface 348. In some examples, this configuration allows the elongate shell 102 to snap on, where the shape of the second latching element 224 reduces a force required to snap the elongate shell 102 onto the elongate base 104 while also ensuring that the elongate shell 102 is securely held on the elongate base 104.

1.2 Elongate Shell

In the example of FIG. 3, the elongate shell 102 has a semi-circular profile. As is mentioned above, the first flange 212 and the second flange 216 extend from the first edge 210 and the second edge 214, respectively toward the hollow interior space delimited by the inner surface 208 of the elongate shell 102.

In general, the first flange 212 and the second flange 216 are dimensioned to ensure that they make contact with the first and second latching elements 222, 224 respectively, when the elongate shell 102 is assembled onto the elongate base 104.

1.3 Methods of Assembly

In one example, to assemble the wooden bumper assembly 100, the elongate base 104 is first attached (e.g., by inserting screws through the attachment portion 226) to a surface such as an outer surface of a product storage fixture (not shown). The elongate shell 102 is then positioned over the elongate base 104 before being lowered onto the elongate base 104 until the elongate shell 102 is securely held on the elongate base 104 by the latching elements 222, 224.

Focusing first on the first latching element 222, as the elongate shell 102 is lowered onto the elongate base 104, the first flange 212 makes contact with the first inclined surface 348 of the first latching element 222. As the elongate shell 102 continues to be lowered onto the elongate base 104, the first flange 212 maintains contact with the first inclined surface 348. One or both of the elongate shell 102 and the first latching element 222 flex or are deflected as the first flange 212 moves along the first inclined surface 348.

After the first flange 212 moves past the first inclined surface 348, the first flange 212 moves to a position where it engages the first shoulder 350 with a portion of the first latching element 222 resting in a first channel 364 formed between the first flange 212 and the inner surface 208 of the elongate shell 102.

Moving to the second latching element 224, as the elongate shell 102 is lowered onto the elongate base 104, the second flange 216 makes contact with the second inclined surface 360 of the second latching element 224. As the elongate shell 102 continues to be lowered onto the elongate base 104, the second flange 216 maintains contact with the second inclined surface 360. One or both of the elongate shell 102 and the second latching element 224 flex or are deflected as the second flange 216 moves along the second inclined surface 360.

After the second flange 216 moves past the second inclined surface 360, the second flange 216 moves to a position where it engages the second shoulder 362 with a portion of the second latching element resting in a second channel 366 formed between the second flange 216 and the inner surface 208 of the elongate shell 102.

In another example, to assemble the wooden bumper assembly 100, rather than pressing the elongate shell 102 onto the elongate base 104 after the base 104 is attached to a surface, the elongate shell 102 is slid onto the elongate base 104 from the side. For example, the elongate base 104 can be shaped to conform to the interior of the elongate shell 102. The elongate base 104 is then placed "end-to-end" with the elongate shell 102 with the elongate base 104 aligned with the hollow interior of the elongate shell 102. The elongate base 104 and the elongate shell 102 are then slid together such that the elongate base 104 is nested within the elongate shell 102.

In yet another example, the first flange 212 of the elongate shell 102 is "hooked" behind the first latching element 222 and the elongate shell is then "hinged" down until the second flange 214 snaps over the second latching element 224.

2 Wooden Bumper Assembly with Metal Base

Figure 4:
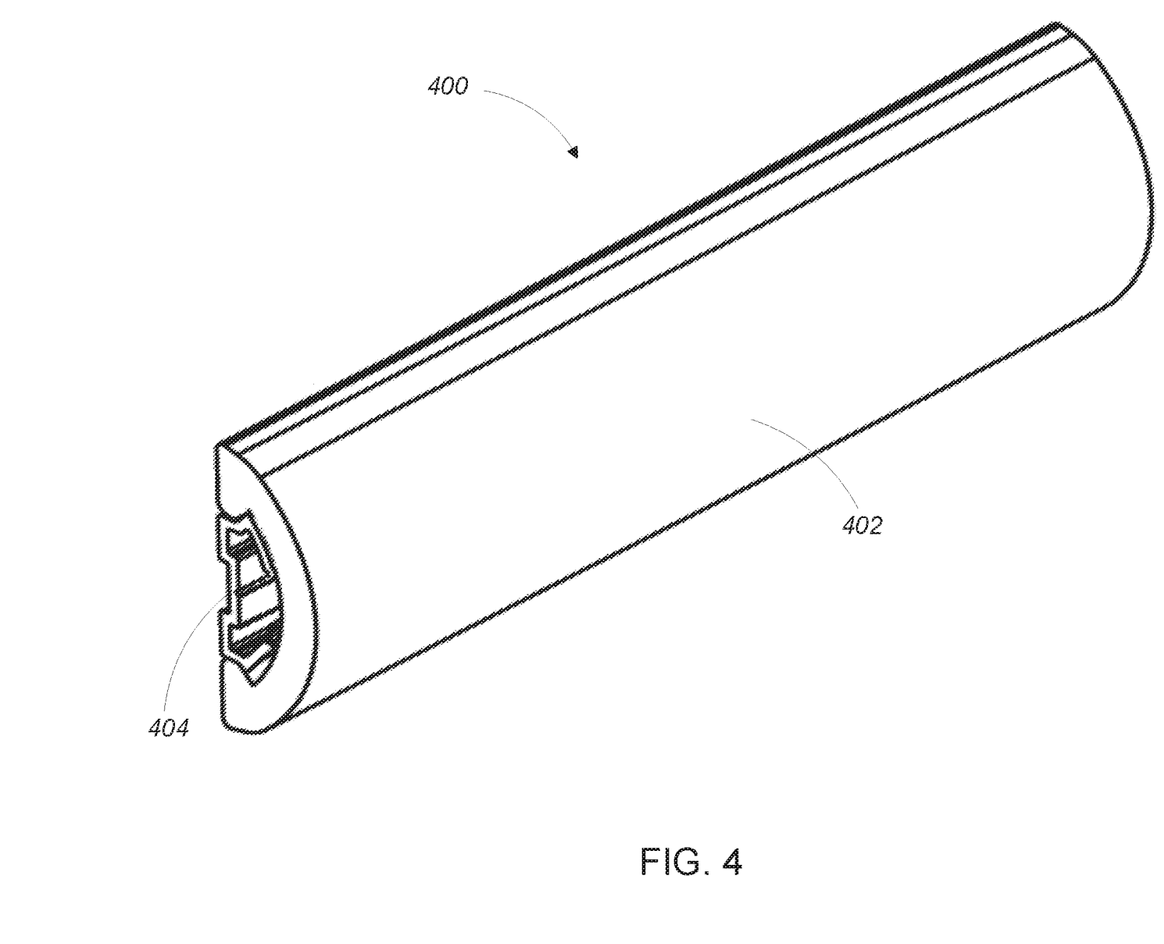
FIG. 4 is a perspective view of a wooden bumper assembly with an aluminum base.

Referring to FIG. 4, a wooden bumper assembly 400 includes an elongate shell 402 and an elongate base 404. In the example of FIG. 4 the elongate shell 402 is fabricated from wooden material (e.g., laminated bamboo strips) and the elongate base 404 is fabricated from a resilient metallic material (e.g., aluminum). In FIG. 4, the wooden bumper assembly 400 is shown in its assembled state, with the elongate base 404 inserted into the elongate shell 402. Very generally, the wooden bumper assembly 400 has a simplified installation process (as is described in greater detail below) due to the elongate base 404 and the elongate shell 402 being formed as two separate parts.

Figure 5:
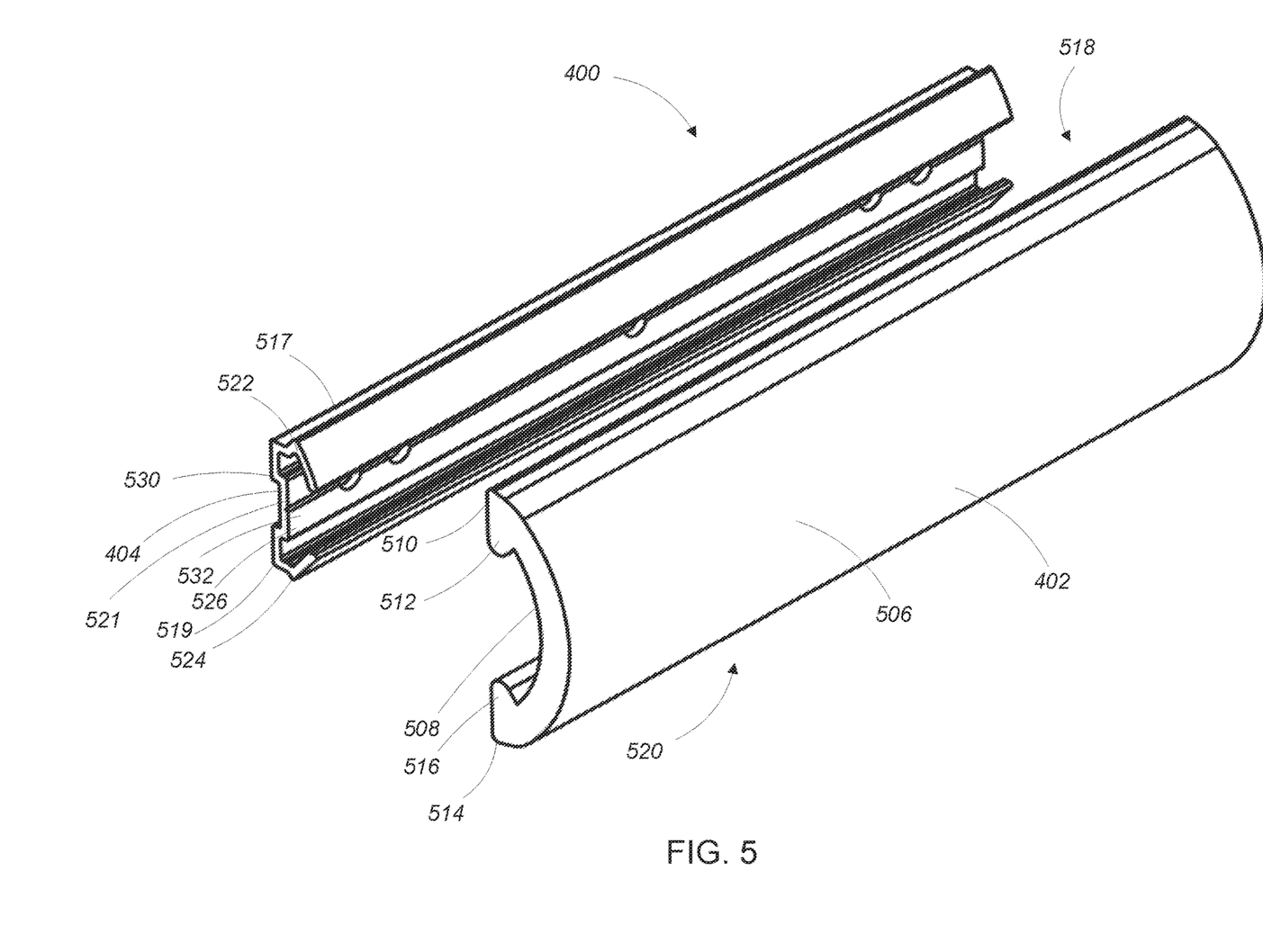
FIG. 5 is an exploded view of the wooden bumper assembly of FIG. 4.

Referring to FIG. 5, an exploded view of the wooden bumper assembly 400 shows the elongate shell 402 and the elongate base 404 in a disassembled state. The elongate shell 402 is a substantially hollow, semi-cylindrical member including an outer surface 506, an inner surface 508, a first edge 510, a first flange 512, a second edge 514, and a second flange 516. The outer surface 506 of the elongate shell 402 faces away from the elongate base 404 and serves as the surface of the elongate shell 402 that receives the force of impact of objects that hit the wooden bumper assembly 400. The inner surface 508 of the elongate shell 402 faces the elongate base 404.

The first edge 510 runs along a length of a first side 518 of the elongate shell 402. The first flange 512 runs along the length of the elongate shell 402 and extends from the first edge 510 toward the hollow interior space delimited by the inner surface 508 of the elongate shell 502. The second edge 514 runs along a length of a second side 520 (opposite the first side 518) of the elongate shell 402. The second flange 516 runs along the length of the elongate shell 402 and extends from the second edge 514 toward the hollow interior space delimited by the inner surface 508 of the elongate shell 402.

As described in greater detail below, the elongate base 404 includes a base body 521 having a first side 530 which lies flush with a mounting surface when the elongate base 404 is installed. The base body 521 has a second side 532 facing away from the first side 530 and including a number of elements including an attachment portion 526, a first latching element 522 extending from a first base edge 517, and a second latching element 524 extending from a second base edge 519, each of which extends along a length of the elongate base 404.

2.1 Elongate Base

Figure 6:
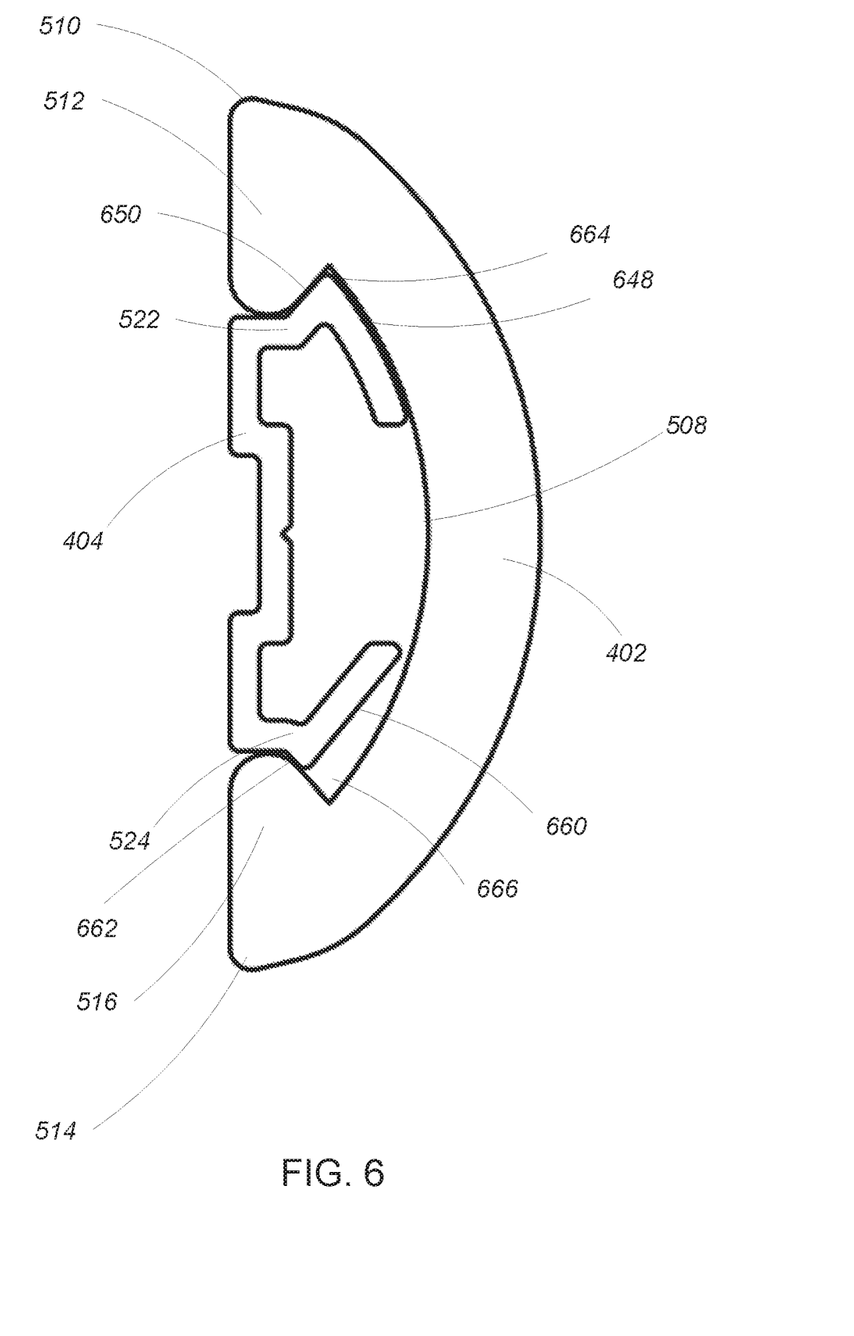
FIG. 6 is a cross-sectional view of the wooden bumper assembly of FIG. 4.

Referring to FIG. 6, in a cross-sectional view of the wooden bumper assembly 400 with a metallic base, the first latching element 522 includes a first inclined surface 648 and a first shoulder 650. The second latching element 524 includes a second inclined surface 660 and a second shoulder 662. In the example shown in FIG. 6, the second latching element 524 is shorter than the first latching element 522 and the second inclined surface 660 has a steeper incline than the first inclined surface 548. In some examples, this configuration allows the elongate shell 402 to snap on, where the shape of the second latching element 524 reduces a force required to snap the elongate shell 402 onto the elongate base 404 while also ensuring that the elongate shell 402 is securely held on the elongate base 404.

In operation, the first and second latching elements 522, 524 are designed to flex inward toward the base body 521 when a force is applied to the inclined surfaces 648, 660 of the latching elements 522, 524.

2.2 Elongate Shell

In the example of FIG. 6, the elongate shell 402 has a semi-circular profile. The first flange 512 and the second flange 516 each extend from the first edge 510 toward the hollow interior space delimited by the inner surface 508 of the elongate shell 402.

In general, the first flange 512 and the second flange 516 are dimensioned to ensure that they make contact with the first and second latching elements 522, 524, respectively, when the elongate shell 402 is assembled onto the elongate base 404.

2.3 Methods of Assembly

In one example, to assemble the wooden bumper assembly 400, the elongate base 404 is first attached (e.g., by inserting screws through the attachment portion 526) to a surface such as an outer surface of a product storage fixture (not shown). The elongate shell 402 is then positioned over the elongate base 404 before being lowered onto the elongate base 404 until the elongate shell 402 is securely held on the elongate base 404 by the latching elements 522, 524.

Focusing first on the first latching element 522, as the elongate shell 402 is lowered onto the elongate base 404, the first flange 512 makes contact with the first inclined surface 648 of the first latching element 522. As the elongate shell 402 continues to be lowered onto the elongate base 404, the first flange 512 maintains contact with the first inclined surface 648. One or both of the elongate shell 402 and the first latching element 522 flex or are deflected as the first flange 512 moves along the first inclined surface 648.

After the first flange 512 moves past the first inclined surface 648, the first flange 512 moves to a position where it engages the first shoulder 650 with a portion of the first latching element 522 resting in a first channel 664 formed between the first flange 512 and the inner surface 508 of the elongate shell 402.

Moving to the second latching element 524, as the elongate shell 402 is lowered onto the elongate base 404, the second flange 516 makes contact with the second inclined surface 660 of the second latching element 524. As the elongate shell 402 continues to be lowered onto the elongate base 404, the second flange 516 maintains contact with the second inclined surface 660. One or both of the elongate shell 402 and the second latching element 524 flex or are deflected as the second flange 516 moves along the second inclined surface 660.

After the second flange 516 moves past the second inclined surface 660, the second flange 516 moves to a position where it engages the second shoulder 662 with a portion of the second latching element 524 resting in a second channel 666 formed between the second flange 516 and the inner surface 508 of the elongate shell 402.

In another example, to assemble the wooden bumper assembly 400, rather than pressing the elongate shell 402 onto the elongate base 404 after the base 404 is attached to a surface, the elongate shell 402 is slid onto the elongate base 404 from the side. For example, the elongate base 404 can be shaped to conform to the interior of the elongate shell 402. The elongate base 404 is then placed "end-to-end" with the elongate shell 402 with the elongate base 404 aligned with the hollow interior of the elongate shell 402. The elongate base 404 and the elongate shell are then slid together such that the elongate base 404 is nested within the elongate shell 402.

In yet another example, the first flange 512 of the elongate shell 402 is "hooked" behind the first latching element 522 and the elongate shell is then "hinged" down until the second flange 514 snaps over the second latching element 524.

3 Alternatives

One wooden material that is particularly useful for making the bumper assemblies described herein is a bamboo material. However, it is noted that other wooden materials can be used instead of bamboo (e.g., maple, oak, pine, and so on).

It is also noted that the term 'wooden,' as used herein, is meant to include materials such as bamboo which are not technically wood (bamboo is a grass) but are colloquially considered to be equivalent to wood. Furthermore, other plant based materials can be used to make the bumper assemblies and should be considered to fall under the umbrella of 'wooden' materials in this application.

The shapes of bumper assemblies are not limited to those described above and can be adapted to any number of applications. For example, a rectangular or trapezoidal elongate shell may be used.

In some examples, only one edge of the elongate base includes a latching element and only one edge of the elongate shell includes a flange. In some examples, one edge of the elongate shell is installed (e.g., latched) onto the elongate base and then the other side of the elongate shell is pressed onto the base (as is described above) to secure the elongate shell onto the elongate base.

In some examples, the latching elements, the flanges, and/or the support elements are discontinuous.

In some examples, the bumper assembly includes corner caps such that the bumper assembly can be installed on surfaces that include corners. In some examples, the corner caps include features similar to the features of the elongate shell and are configured to engage the latching elements of the elongate base in the same manner that the elongate shell engages the latching elements.

In some examples, end caps are affixed at the distal ends of the bumper assembly, as is described in U.S. patent application Ser. No. 14/573,204, which is hereby incorporated herein by reference.

In some examples, the elongate base and the elongate shell can each be considered to have a rigidity. And the relative rigidities of the two elements can be different to achieve different outcomes. For example, the base may be relatively more rigid than the shell such that the base flexes to allow assembly of the shell onto the base. In another example, the shell may be relatively less rigid than the base such that the shell flexes to allow for assembly of the shell onto the base. In yet another example, the base and the shell may have relatively similar rigidities such that they both flex to facilitate assembly. In a final example, the base and the shell both have rigidities that substantially prevent the elements from flexing.

The rigidities of the base and shell can be controlled by material choice, material thickness, material geometry, or a combination of the three.

In some examples, rather than attaching the elongate shell to a surface using the elongate base, concealable connectors (e.g., snap lock, zero reveal connectors) such as those offered by Star Hanger Systems are used to attach the elongate base to the surface.

It is to be understood that the foregoing description is intended to illustrate and not to limit the scope of the invention, which is defined by the scope of the appended claims. Other embodiments are within the scope of the following claims.

What is claimed is:

1. A bumper assembly comprising:
an elongate shell formed of a wooden material, the shell including
an inner surface;
an outer surface;
a first shell edge; and
a first flange protruding from the first shell edge in a direction toward the inner surface of the elongate shell;
an elongate base including
a base body including a first base edge; and
a first latching element extending from the first base edge of the base body, the first latching element having a first inclined outer surface and a first shoulder;
wherein the elongate base is configured for insertion into the elongate shell with the first flange engaging the first shoulder of the first latching element.

2. The bumper assembly of claim 1 wherein the wooden material is a bamboo material.

3. The bumper assembly of claim 1 wherein the elongate base is formed of the wooden material.

4. The bumper assembly of claim 3 wherein the wooden material is a bamboo material.

5. The bumper assembly of claim 1 wherein the elongate base is formed of a metallic material.

6. The bumper assembly of claim 5 wherein the metallic material is an aluminum material.

7. The bumper assembly of claim 1 wherein the first latching element is flexible.

8. The bumper assembly of claim 1 wherein the first latching element is rigid.

9. The bumper assembly of claim 1 wherein the outer surface of the elongate shell has a substantially semi-cylindrical shape.

10. The bumper assembly of claim 1 wherein a cross section of the outer surface of the elongate shell has a substantially trapezoidal shape.

11. The bumper assembly of claim 1 wherein a cross section of the outer surface of the elongate shell has a substantially rectangular shape.

12. The bumper assembly of claim 1 wherein
the elongate shell further includes
a second shell edge, and
a second flange protruding from the second shell edge in a direction toward the inner surface of the elongate shell, and
the elongate base further includes
a second base edge, and
a second latching element extending from the second base edge of the base body, the second latching element having a second inclined outer surface and a second shoulder,
wherein the elongate base is further configured for insertion into the elongate shell with the second flange engaging the second shoulder of the second latching element.

13. The bumper assembly of claim 12 wherein the second latching element is smaller than the first latching element and the second inclined outer surface has a steeper incline than the first inclined outer surface.

14. The bumper assembly of claim 12 wherein the second latching element is flexible.

15. The bumper assembly of claim 12 wherein the second latching element is rigid.

* * * * *